May 30, 1950
H. G. BUSIGNIES
2,509,207
SIGNAL COMPARISON SYSTEM
Filed April 26, 1944
3 Sheets-Sheet 1
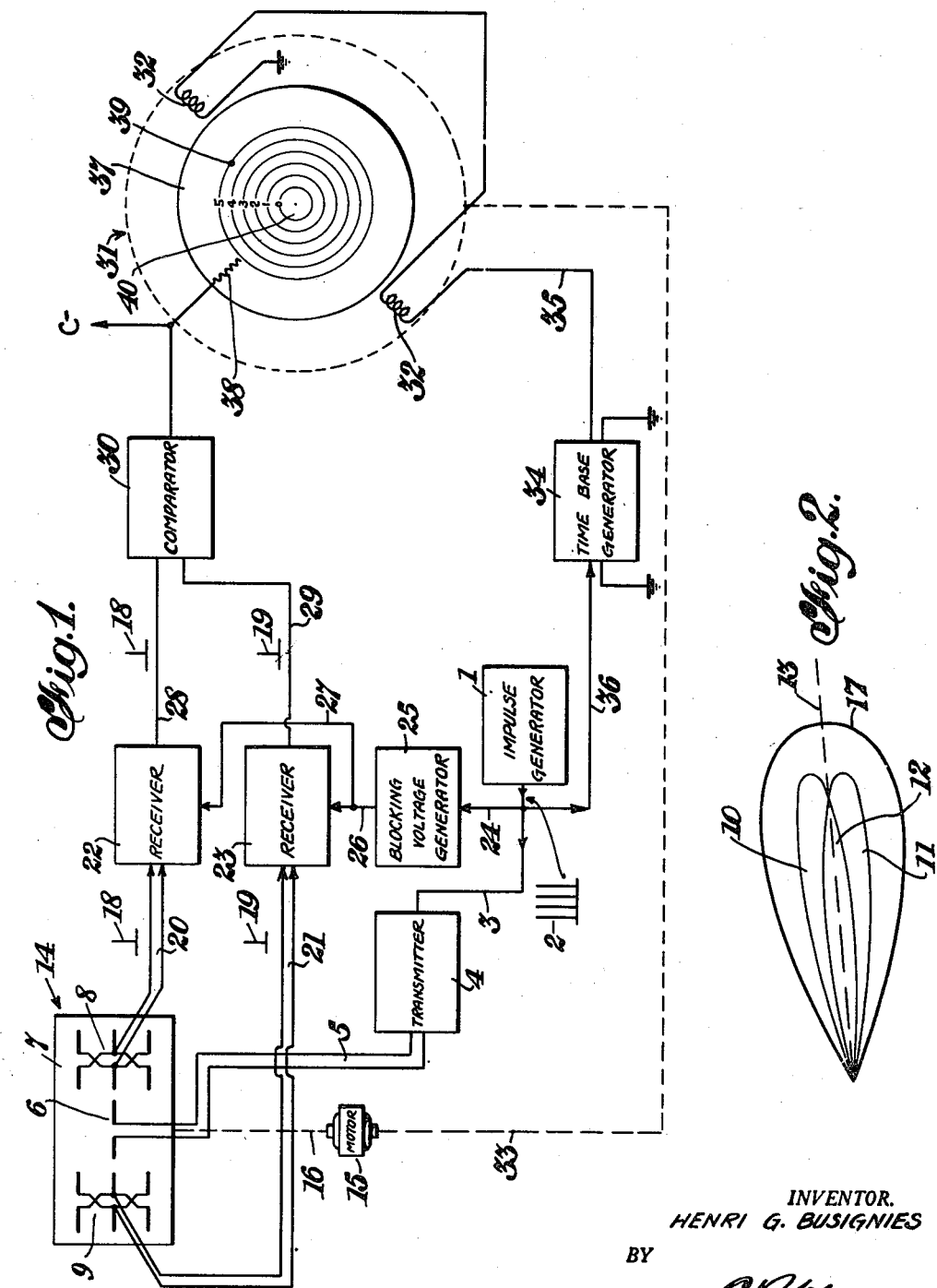
INVENTOR.
HENRI G. BUSIGNIES
BY
ATTORNEY May 30, 1950 — H. G. BUSIGNIES — 2,509,207
SIGNAL COMPARISON SYSTEM
Filed April 26, 1944 — 3 Sheets-Sheet 2
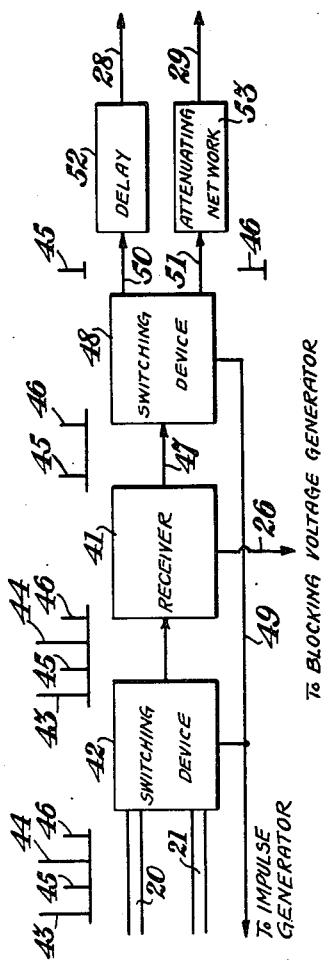
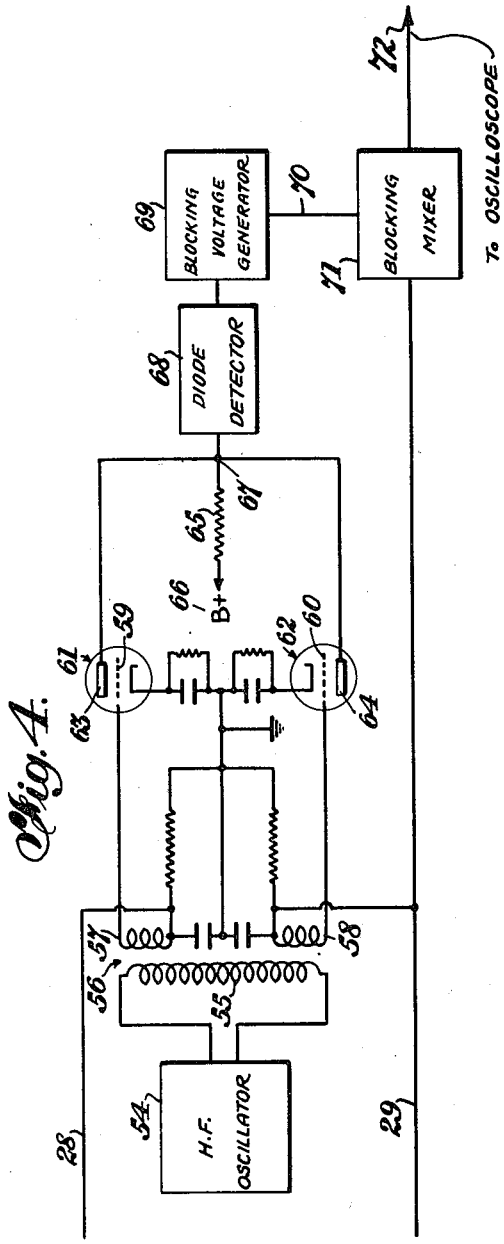
INVENTOR.
HENRI G. BUSIGNIES
BY
R. P. Morris
ATTORNEY

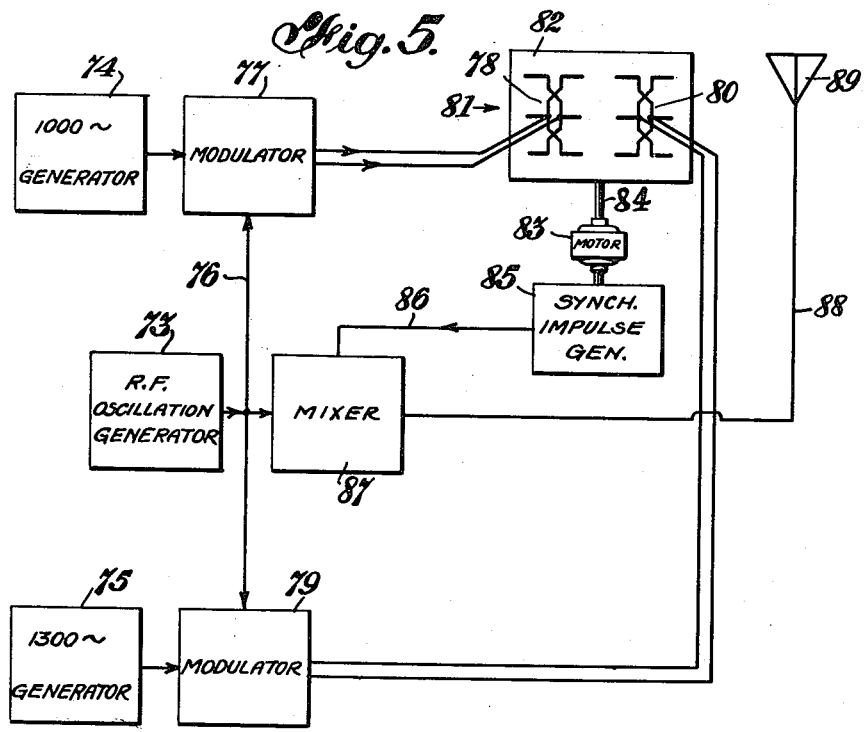
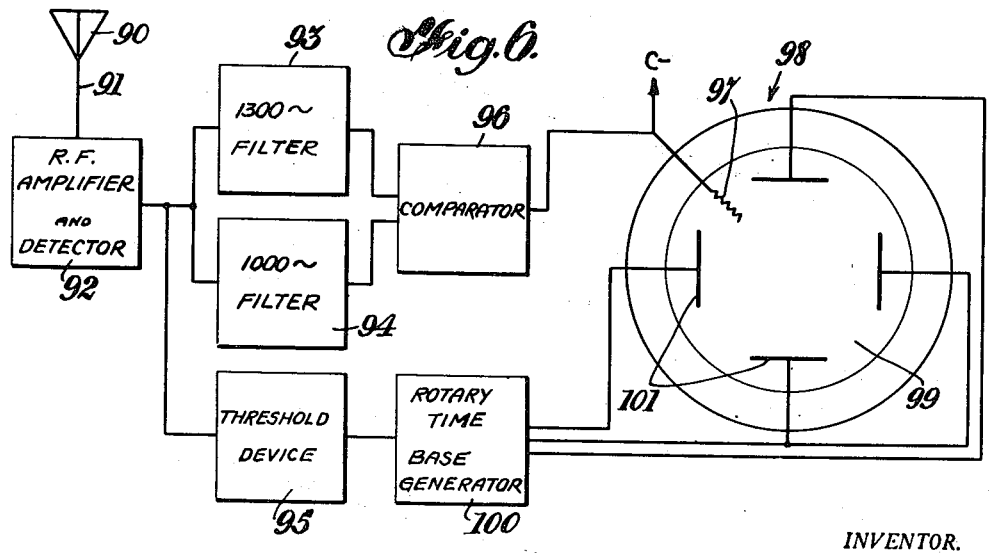

Patented May 30, 1950

2,509,207

UNITED STATES PATENT OFFICE 2,509,207

SIGNAL COMPARISON SYSTEM

Henri G. Busignies, Forest Hills, N. Y., assignor to Federal Telephone and Radio Corporation, New York, N. Y., a corporation of Delaware Application April 26, 1944, Serial No. 532,799

16 Claims. (Cl. 343—118)

This invention relates to signal comparison systems particularly as used in radio direction indicating arrangements such as direction finding, obstacle detection, beacon, and similar systems.

In systems of the type to which this invention has reference either the transmitting antennae or the receiving antennae or both are directional. The intensity of energy radiated by a directional transmitting antenna varies in different directions according to a pattern which may be termed the "radiation pattern." Analogically, the potentials produced in a directional receiving antenna in a uniform radiant energy field vary in different directions according to a pattern which may be termed a "reception pattern." In the specification and claims the term "radiation action pattern" is used generically for radiation pattern and reception pattern. Such radiant action patterns have been used in various systems as a means of obtaining an indication of direction.

An object of the present invention is the provision of a novel method and means for using radiant action patterns to obtain an indication of direction.

Another object of the present invention is the provision of a method and means for obtaining an accurate direction indication by comparing a plurality of radiant action patterns.

According to one aspect of this invention two patterns bear an inter-relationship indicative of direction and when the received energies are compared and found to have a predetermined ratio of values, energy is released to a suitable utilization device which may be, for example, an indicator. The patterns may be overlapping patterns providing a zone wherein this predetermined ratio exists, which zone indicates direction.

A further object of the invention is the provision of a comparator device which will serve to compare two pulses, and will pass a pulse only when the compared pulses bear a predetermined relation to one another.

In certain directional systems, an oscilloscope is used in indicating direction. The oscilloscope may be arranged to provide a radial deflection and rotary deflection of the beam. In one method of operation when the current received according to a radiant action pattern is above a certain energy level, energy is applied to the control electrode of the oscilloscope and an indication appears on the screen thereof. This indication will be positioned angularly in accordance with the direction and radially in accordance with the distance. This indication may be a light spot if the screen is normally dark or a dark spot if the screen is normally light.

For various reasons, the aforesaid indication cannot practically be made sharp, so that the indication is in the form of an arc instead of a small spot or point. It is therefore difficult to accurately determine direction from such an indication. One of the reasons for this difficulty is that radiant action patterns cannot be practically obtained which are sharp enough.

A further object of the present invention is to obtain a sharper indication in a system of the general type referred to in the foregoing paragraph.

Other and further objects of the present invention will become apparent and the foregoing will be best understood from the following description of embodiments thereof as used in various types of systems, reference being had to the drawings in which:

Fig. 1 is a schematic and block circuit diagram of an obstacle indication system embodying my invention;

Fig. 2 is a diagram of a pair of overlapping radiant action patterns providing a zone of equal action indicative of a line of direction.

Fig. 3 is a block diagram of a modification of part of the system illustrated in Fig. 1;

Fig. 4 is a schematic and block circuit diagram of the comparator illustrated in Figs. 1; and Figs. 5 and 6 are schematic and block circuit diagrams of a beacon system embodying my invention, Fig. 5 showing the transmitter and Fig. 6 the receiver.

In the systems herein described, direction indication forms an integral part of each system. In accordance with my invention, in each of these systems a plurality of radiant action patterns are provided whose inter-relationship is such as to indicate direction. Energy is received in accordance with each of such patterns and the respective energies are compared. If in the comparison, such energies are found to have values bearing a predetermined ratio to each other, the energy is released to a suitable utilization device such as an indicator, and an indication is obtained which has direction significance.

In the foregoing paragraph the inter-relationship of the patterns may consist of their physical overlapping to provide a zone of equal action. The aforesaid predetermined ratio may be a one-to-one ratio, that is, the energy received according to each of the patterns may be equal when energy is released to the utilization device.

Referring now to Fig. 1, an impulse generator 1 generates pulses 2 which are fed through a line 3 to a transmitter 4. In the transmitter 4, the pulses 2 are amplified and translated into radio frequency pulses. The resulting radio frequency pulses are then fed through line 5 to a transmitting antenna 6, where they are radiated. Antenna 6 is arranged in front of a reflecting surface or screen 7 to give it a unidirectional action. Separate sets of receiving antennae 8 and 9 are also mounted on said reflecting surface 7, antennae 8 receiving in accordance with pattern 10 and antennae 9 receiving in accordance with pattern 11 of Fig. 2.

Patterns 10 and 11 bear a predetermined relationship to each other indicative of a line of direction. In the case of the patterns illustrated in Fig. 2, this relationship indicative of a line of direction is provided by overlapping patterns 10 and 11 to produce a zone 12 of equal action which indicates a line of direction 13.

The overlapping patterns illustrated in Fig. 2 may be also produced by having a transmitting system consisting of a plurality of directional transmitting antennae for the beacon system to be later described.

The entire antenna assembly 14, consisting of antennae 6, 8 and 9 and the reflecting surface 7, is rotated by means of a motor 15 mechanically connected by any suitable mechanical driving means 16 to said assembly.

Antenna 6 radiates pulses all the time the assembly 14 is being rotated. These pulses are being transmitted according to a radiation pattern 17 (Fig. 2). When these pulses strike an obstacle they are reflected and produce potentials in antennae 8 and 9 in accordance with the radiant action patterns 10 and 11. For each transmitted pulse two separate pulsing potentials or echo pulses 18 and 19 are received by antennae 8 and 9 respectively. These will be of equal value if the obstacle is in the direction indicated by line 13 but will have different values if the obstacle is in a different direction. The pulses 18 and 19 are transmitted by lines 20 and 21 to receivers 22 and 23 respectively.

As is well understood in this art, in order to prevent the transmitted pulses 2 from being received directly, thus interfering with reception of the echo pulses, means are provided for blocking the receivers when each of pulses 2 is being transmitted. For this purpose the impulse generator 1 is also connected by line 24 to a blocking voltage generator 25 and controls the generation of blocking voltages. The blocking voltages generated by blocking voltage generator 25 are applied through lines 26 and 27 to the receivers 22 and 23 and thereby block the receivers 22 and 23 whenever a pulse is being transmitted.

After transmission is effected the blocking is removed and echo pulses 18 and 19 pass through the receivers where they are amplified and their carrier frequencies removed. It is important, as will be apparent from the subsequent description, that the gain of both receivers be equal and linear since pulses 18 and 19 are subsequently compared in regard to their amplitude. The output of receivers 22 and 23 is delivered by means of lines 28 and 29 to a device 30 in which the amplitude of pulses 18 and 19 is compared. This device 30 may be termed a "comparator" and the details thereof will be described in connection with Fig. 4. If upon comparison the values of pulses 18 and 19 bear a predetermined ratio to each other, then energy is released by the comparator to a utilization device. In the arrangement illustrated in Fig. 4, the predetermined ratio is a ratio of about one-to-one, or substantial equality. That is, when the amplitude of pulses 18 and 19 is substantially the same, energy is released by the comparator. This energy is then fed to a suitable utilization device.

The aforesaid utilization device as illustrated in Fig. 1 consists of an oscilloscope having a pair of deflecting coils 32 which are adapted to be rotated at the same speed at which the assembly 14 is rotated. For this purpose suitable mechanical driving means 33 connect motor 15 to coils 32 and cause the rotation of said coils at the same rate as the rotation of assembly 14.

To provide for radial deflection of the beam, a time base generator 34 is provided which is connected by lines 35 to the deflection coils 32. The time base generator 34 is synchronized with the transmitted pulses by connecting said time base generator by means of line 36 to the output of the impulse generator 1. The time base generator 34 is timed so that the beam of the oscilloscope 31 will be at the center of the screen 37 when a pulse is being transmitted by the transmitting antenna 6.

If the transmitted pulse strikes an obstacle and is then returned to the receiving antennae 8 and 9, the resulting received pulse energies in each of antennae 8 and 9 are compared in the comparator 30 and when said received pulse energies are of equal value, energy is supplied to the control electrode 38 of the oscilloscope by the comparator. The control electrode may be normally biased to cut-off so that normally no light appears on the screen 37. When, however, the comparator 30 releases energy, this energy serves to produce a spot of light such as spot 39 on screen 37. The radial distance from the center 40 of the screen to the spot 39 indicates the time required for the transmitted pulse, to get to the obstacle and back and therefore is an indication of the distance of said obstacle. A line drawn from the center 40 to the spot 39 also quite accurately indicates the direction of the obstacle as will be seen from the following.

The spot 39 will only be produced when the echo pulses 18 and 19 are of equal amplitude. The pulses 18 and 19 are of equal amplitude only when the radiation action patterns 10 and 11 of antennae 8 and 9 are aligned with the obstacle, that the obstacle is along line 13, that is, it is aligned with the zone of equal action. Therefore, there is only a relatively narrow zone in one direction in the rotation of assembly 14 at which an indication will be obtained on the oscilloscope. Since the deflecting coils 32 rotate synchronously with the assembly 14, at the time when spot 39 is produced, the spot will be deflected by said coils in a direction from the center 40 which corresponds to the direction the antenna assembly 14 is facing. By these means a sharp indication of direction is obtained.

From the foregoing description it will be seen that an indication is obtained on the screen of the oscilloscope only when the antenna assembly 14 is precisely facing the obstacle which is to be detected. Since said assembly is rotating continuously, it will be seen that the indication produced will consist of a momentary flash of light on the screen. If it is desired that this spot should appear as a constant spot of light, then it will be obvious that the antenna assembly should be rotated at a speed such that successive indications occur on the screen at a sufficiently rapid rate so that visual persistency will make the successive spots of light seem like a continuous light spot. It is, of course, to be understood that the repetition rate of the emitted pulses is of a very much higher order than that of the rate of rotation of the antenna assembly.

It will be apparent that the system illustrated in Fig. 1 may be used solely as a direction finder without the obstacle detection feature. In such case the transmitting antenna 6, transmitter 4, blocking voltage generator 25, impulse generator 1 and time base generator 34 may be dispensed with. Radial deflection of the beam may be produced by applying a fixed direct current to the coils 32.

In place of the two receivers 22 and 23 of Fig. 1, a single receiver 41 may be employed in an arrangement such as illustrated in Fig. 3. A single receiver dispenses with the necessity for matching two receivers such as 22 and 23 so that they will have equal gain. However, if a single receiver 41 is used, an arrangement similar to the one hereinafter described is preferably employed.

In this arrangement lines 20 and 21 from antennae 8 and 9 respectively are connected to a switching device 42 which may be an electronic switching device and is adapted to produce switching at the repetition rate of the transmitted pulses 2. Each of transmitted pulses 2 are separated by a sufficient interval so that for the given range in which said system is operative the reflection of each transmitted pulse will return before the next pulse is transmitted. The receiver 41 is, of course, blocked at the time any pulses are being transmitted and for this purpose the receiver is connected by line 26 to the source of blocking voltages which may be the blocking voltage generator 25.

If pulses 43 and 44 (Fig. 3) are being transmitted, echo pulses 45 and 46 which are the reflections of transmitted pulses 43 and 44 respectively, will be received on each of antennae 8 and 9 and will be conveyed by lines 20 and 21 to switching device 42. The output of switching device 42 is connected to receiver 41. If line 20 is first connected to the output of switching device 42 when the pulse 45 is received, echo pulse 45 as received on antennae 8 will be transmitted to the receiver while echo pulse 45 as received on antennae 9 is of no effect since antennae 9 is not connected to the receiver at the time of the arrival of echo pulse 45. Before the next echo pulse 46 returns the switching device operates to connect antennae 9 to the receiver while antennae 8 are disconnected. Consequently echo pulse 46 is received on antennae 9. It will therefore be seen that echo pulse 45 is received by antennae 8 in accordance with radiation action pattern 10 and echo pulse 46 is received by antennae 9 in accordance with radiation action pattern 11. Assuming that the transmitted pulses 43 and 44 are of equal amplitude and that the antenna assembly 14 is facing the obstacle, that is, the obstacle is in the line of direction indicated by line 13, Fig. 2, then echo pulses 45 and 46 as received on antennae 8 and 9 respectively will be of equal amplitude.

Echo pulses 45 and 46 then pass successively through the receiver 41 where they are amplified and have their radio frequency components removed. Pulses 45 and 46 are then transmitted over line 47 to switching device 48. Switching device 48 is synchronized with switching device 42 and for this purpose may be connected to it by a line 49 which is in turn connected to the output of impulse generator 1 so that the switching occurs at the repetition rate of the transmitted pulses. Switching device 48 separates alternate pulses and delivers them at its output to lines 50 and 51. For example, pulse 45 is delivered to line 50 and pulse 46 is delivered to line 51.

It will be seen that at the output of switching device 48, pulse 45 appears in advance of pulse 46. Since it is desired to compare pulses 45 and 46 in the comparator 30, it is desirable that both pulses be coincident. For this purpose echo pulse 45 is delayed by a suitable delay device 52 so that at the output of said device, pulse 45 will be in synchronism with pulse 46. Since a certain amount of attenuation will occur in the delay device 52 a balancing attenuating network is provided in series with line 51 to correspondingly attenuate pulse 46 so that both pulses remain at the same relative amplitude. The output of delay device 52 is connected by means of line 28 to comparator 30 while the output of attenuating network 53 is connected by means of line 29 to said comparator. In said comparator 30 the two synchronous pulses are compared and the mode of operation indicated in connection with Fig. 1 then follows.

Referring now to Fig. 4, I have there illustrated one form of comparator incorporating the principles of my invention, the operation of which is as follows. The output of a high frequency oscillator 54 is applied to the primary 55 of a transformer 56 having two separate secondary coils 57 and 58. The induced potentials in coils 57 and 58 are respectively applied to the grids 59 and 60 of two tubes 61 and 62 which have their respective anodes 63 and 64 connected together and through a suitable load resistor 65 to a positive source of anode potential 66. Since the high frequency voltages applied to grids 59 and 60 respectively are equal and 180° out of phase, at point 67 the opposing effects of these voltages in the anode circuits of tubes 61 and 62 cancel each other, and the potential at point 67 does not vary. Grids 59 and 60 are also impressed with voltages from lines 28 and 29 which lines carry received pulses which may be, for example, pulses 18 and 19 of Fig. 1 or pulses 45 and 46 of Fig. 3. If the pulses delivered by lines 28 and 29 to grids 59 and 60 respectively are of equal amplitude, then the high frequency output of tubes 61 and 62 will also be equal and since they are in phase opposition, they will cancel each other at point 67. If, however, the pulses delivered by lines 28 and 29 are unequal, they will not cancel each other at the output of tubes 61 and 62. Consequently whenever the pulses delivered by lines 28 and 29 are unequal there will be a high frequency voltage at point 67. This high frequency voltage is rectified in any suitable rectifier such as a diode rectifier 68, and the output of said rectifier is used to actuate a blocking voltage generator 69 and produce blocking voltages. These blocking voltages are applied through a line 70 to a blocking mixer 71 of known amplifier form. The pulses carried by either line 28 or line 29 (in the embodiment shown in Fig. 4 it is the pulses carried by line 29) are passed through the blocking mixer 71. These last-mentioned pulses will pass through the blocking mixer if no blocking voltage is generated. No blocking voltage will be generated if the pulses carried by lines 28 and 29 are of equal amplitude. Accordingly it will be seen that pulses carried by lines 28 and 29 are compared and if they are equal, pulses transmitted over line 29 will be permitted to pass through the blocking mixer 71. The output of blocking mixer 71 is then delivered over a line 72 to the control electrode 38 of the oscilloscope 31.

Tubes 61 and 62 are biased by any suitable means and, if desired, may be normally biased at or close to cut-off, so that in the absence of signals from lines 28 and 29, there will be no conduction by said tubes. Then when the signals from lines 28 and 29 are applied in a positive direction, tubes 61 and 62 will conduct the high frequency oscillations for the duration of said incoming signals.

In Figs. 5 and 6 I have illustrated a beacon system embodying my invention. The transmitter of the beacon system is illustrated in Fig. 5. Referring now to said figure, radio frequency energy is generated by an R. F. oscillation generator 73. In addition, two audio frequency generators 74 and 75 are employed which generate different audio frequencies. For example, generator 74 may produce a frequency of 1000 cycles while generator 75 may produce a frequency of 1300 cycles. The output of R. F. oscillation generator 73 is fed over a line 76 to a modulator 77 where it is modulated by the output of generator 74. The output of modulator 77 is fed to an antenna array 78. Similarly the output of R. F. oscillation generator 73 is also fed to another modulator 79 where it is modulated by the output of generator 75. The output of modulator 79 is then delivered to an antenna array 80. Antennae arrays 78 and 80 are preferably designed so as to produce overlapping radiant action patterns, more specifically radiation patterns, which overlap such as do patterns 10 and 11 of Fig. 2 to produce a zone of equal action or equal intensity indicative of the line of direction in which the entire assembly 81 faces. The entire antenna assembly may therefore include a reflecting surface 82 on which the antennae arrays 78 and 80 are mounted and with which surface the arrays are adapted to rotate. The antenna assembly 81 is rotated by a motor 83 by means of a mechanical driving arrangement 84. A synchronizing impulse generator 85 is connected to said motor 83 and produces a single impulse at the same point during each rotation of the assembly 81. This impulse is then fed from the synchronizing impulse generator 85 through a line 86 to a mixer 87. The output of R. F. oscillation generator 74 also supplies energy to the mixer 87 but none of said radio frequency energy appears at the output of mixer 87 except when the synchronizing impulse generator delivers a pulse over line 86 to said mixer. In other words, mixer 87 may be normally blocked and is only unblocked when a pulse is delivered over line 86 thereto. The output of mixer 87 which consists of sharp pulses of radio frequency energy is delivered through transmission line 88 to an omni-directional antenna 89.

By the arrangement hereinabove described, antenna array 78 produces a radiation pattern such as, for example, pattern 10 of Fig. 2 consisting of radio frequency energy modulated by a 1000 cycle audio frequency energy. Antenna array 80 produces a pattern similar to pattern 11 of Fig. 2 in which the modulation is of 1300 cycles. The patterns of antennae arrays 78 and 80 overlap to provide a zone of equal action or equal radiation intensity indicative of the line of direction in which the antenna assembly 81 is facing. In addition each time the assembly 81 faces in a selected direction such as, for example, north, a synchronizing pulse is emitted by omni-directional antenna 89.

Referring now to Fig. 6, a receiver for use with such a beacon transmitter is there illustrated. The receiver may have an omni-directional antenna 90 which picks up the synchronizing pulse transmitted by antenna 89 as well as the audio frequency modulated energy emitted by antennae arrays 78 and 80. Of course, it will be understood that the audio frequency modulated energy received by antenna 90 will vary in amplitude in accordance with the direction in which transmitting antenna array 81 is facing.

Receiving antenna 90 is connected by means of the transmission line 91 to R. F. amplifier and detector 92. The output of R. F. amplifier and detector 92 is delivered to three separate devices, a 1300 cycle wave filter 93, a 1000 cycle wave filter 94 and a threshold device 95. The 1300 cycle waves pass through filter 93 and are delivered to a comparator 96 which may be the same as that illustrated in Fig. 4. The 1000 cycle waves pass through filter 94 and are also delivered to the comparator 96. Here the amplitude of the energy received is compared and if said energy is equal, then energy is released to the control electrode 97 of an oscilloscope 98 and a spot of light is produced on the screen 99 of said oscilloscope. The beam of the oscilloscope may be deflected by means of a rotary time base generator 100 connected to the deflection electrodes 101 of the oscilloscope so that the beam will travel in a circle on the screen 99. It will be seen that when antenna array 81 faces receiving antenna 90, the 1300 cycle modulated waves will be of the same amplitude as the 1000 cycle modulated wave and consequently a spot will be produced at that moment on screen 99. The position of said spot will indicate the direction of the transmitter from the receiver if the rotary time base generator is synchronized with the rotation of the transmitting antenna assembly 81. This synchronization is produced by the pulses emitted from antenna 89 which pulses are received by antenna 90 delivered to amplifier and detector 92 and then through a threshold device 95 which blocks all signals having a lesser amplitude than the high amplitude of the synchronizing pulses. The synchronizing pulses at the output of the threshold device are then applied to the rotary time base generator 100 to synchronize the rotation of the spot on screen 99 with the rotation of the transmitting antenna assembly.

While I have described my invention in connection with specific embodiments of obstacle detection, direction finding and beacon systems, it is apparent that my invention may be employed with other types of systems. Moreover, it is also apparent that numerous modifications may be made in the details of said embodiments without departing from the teachings of my invention. As one out of innumerable possible illustrations of this, it will be seen that antenna 6 of Fig. 1 need not be a directional antenna and need not be mounted for rotation. Likewise the receiving antennae 8 and 9 may be of any desired type which will produce the radiant action patterns described. The output of the comparator may be delivered to other utilization devices than oscilloscope 31 and it will be most obvious that the pattern of deflection of the beam in the oscilloscope 31 may be varied.

While I have described above the principles of my invention in connection with specific apparatus, and particular modifications thereof, it is to be clearly understood that this description is made only by way of example and not as a limitation on the scope of my invention as set forth in the objects of my invention and the accompanying claims.

I claim:

1. In a radio direction indicating system in which separate pulse energy is received in accordance with each of two overlapping radiant action patterns having a zone of equal action indicative of a line of direction, a comparator for comparing the received energies and releasing the pulse energy of at least one of them in response to substantial equality in the values of the received energies, and means responsive to the released energy to give an indication of direction, said comparator including a source of high frequency oscillation, means for splitting said high frequency oscillation into two pulsating direct current groups 180° out of phase and each having an amplitude proportional to a separate one of the energies received, means for combining said two groups of oscillations, means to detect any remaining pulsating component of the direct current energy resulting from an unequal combination of the two groups of oscillations, and means for preventing the release of said pulse energy by the comparator in accordance with the pulsating component of the direct current energy remaining as a result of the unequal combination of the two groups of oscillations.

2. A comparator for comparing separate energies and releasing a component thereof in response to equality of said separate energies, said comparator including a source of high frequency oscillation, means for splitting said high frequency oscillation into two pulsating direct current groups 180° out of phase, each group having an amplitude proportional to a separate one of the received energies, means for combining said two groups of oscillations, means to detect any remaining pulsating component of the direct current energy resulting from an unequal combination of the two groups of oscillations, and means employing the resultant detected pulsating energy to control the release of said energy component.

3. In a beacon system, the combination of a transmitter and a receiver, said transmitter including a rotatable antenna array having a plurality of directional antennae producing overlapping radiation patterns having an interrelationship indicative of a line of direction, means for delivering separate signals to separate ones of said directional antennae, said signals being distinguished from each other by an identifying characteristics, an omnidirectional antenna, and means for supplying a synchronizing signal to said omnidirectional antenna at each rotation of the rotatable antenna array; said receiver including means for receiving the various signals including the synchronizing signal, means for separating said separate signals in accordance with the identifying characteristic, means for comparing the separated signals and releasing energy when said separated signals bear a predetermined ratio of value to each other, an indicating device responsive to the released energy, and means responsive to the synchronizing signal for controlling the indicating device.

4. In a radio direction indicating system in which separate signals are received over two antennas having radiant action patterns with an interrelationship indicative of a line of direction, means to alternately control the reception of signals between said antennas, means to delay the signals from one of said antennas for coincidence with signals from the other antenna, means for comparing the coincident signals, means for releasing energy in response to a predetermined ratio of the values of the coincident signals, an indicator, and means to apply the released energy to said indicator to produce an indication.

5. In a direction indicating system for use with a beacon of the character adapted to transmit a pair of rotating overlapping radiation patterns having an interrelationship indicative of a line of direction, the signal energy of each radiation pattern being distinctive, together with a synchronizing signal; means for receiving said distinctive signal energy and said synchronizing signals, means for separating said distinctive signals, means for comparing said distinctive signals to control release of indicator energy when said distinctive signals bear a predetermined ratio of value to each other, an indicator, means responsive to said synchronizing signals for synchronizing the operation of said indicator with respect to the rotation of said patterns, and means to apply said indicator energy to said indicator.

6. A direction indicating system according to claim 5 wherein said indicator is a cathode ray device having a rotating sweep operation and said indicator energy produces radial deflection in the sweep tracing thereof.

7. A radio direction indicating system according to claim 4, wherein said means for comparing the coincident signals comprises a source of high frequency oscillation, means for splitting said high frequency oscillation into two pulsating direct current groups 180° out of phase, each group having an amplitude corresponding to the amplitude of a separate one of the received energies, means to combine the said two groups of oscillations, and means to detect any remaining pulsating component of the direct current energy resulting from an unequal combination of the two groups of oscillations.

8. In a radio direction indicating system in which separate signals are received over two antennas having overlapping radiant action patterns with a zone of equal action indicative of a line of direction, means for rotating said antennas, means to alternately control the reception of signals between said antennas, means to delay the signals from one of said antennas for coincidence with signals from the other antenna, a source of high frequency oscillation, means for splitting said high frequency oscillation in two pulsating direct current groups 180° out of phase, each group having an amplitude proportional to a separate one of the received signals, means to combine said two groups of oscillations, means to detect any remaining pulsating component of the direct current energy resulting from an unequal combination of the two groups of oscillations, means to generate a blocking voltage in response to any detected pulsating direct current, an amplifier, means to apply at least one of said received signals to said amplifier, means to control the cut-off of said amplifier in response to said blocking voltage, an indicator and means to apply the release signal energy from said amplifier means to said indicator to produce an indication.

9. In a radio direction indicating system according to claim 8, wherein said indicator is a cathode-ray device having a rotating sweep operation synchronized with the rotation of the said two antennas and said signal energy produces an indication in the sweep tracing thereof.

10. In a direction indicating system according to claim 5, wherein said means for comparing said distinctive signals to control release of indicator energy comprises a source of high frequency oscillation, means for splitting said high frequency oscillation into two pulsating direct current groups 180° out of phase, each group having an amplitude corresponding to the amplitude of a separate one of the received signal energies, means to combine the said two groups of oscillations, and means to detect any remaining pulsating component of the direct current energy resulting from an unequal combination of the two groups of oscillations, and means to prevent the release of the said indicator energy in accordance with the detection of any pulsating component of the combined oscillations.

11. In a direction indicating system for use with a beacon of the character adapted to transmit a pair of rotating overlapping radiation patterns having a zone of equal action indicative of a line of direction, the signal energy of each radiation pattern being distinctive, together with a synchronizing signal, means to receive said distinctive signal energy and said synchronizing signal, means to separate said distinctive signals, a source of high frequency oscillation, means for splitting said high frequency oscillation into two pulsating direct current groups 180° out of phase, each group having an amplitude proportional to a separate one of the received signal energies, means to combine said two groups of oscillations, means to detect any remaining pulsating component of the direct current energy resulting from an unequal combination of the two groups of oscillations, means to generate a blocking voltage in response to said detected pulsating direct current, an amplifier, means to apply at least one of said received signal energies to said amplifier, means to control the cut-off of said amplifier in response to said blocking voltage, a cathode-ray device having a rotating sweep operation, means responsive to said synchronized signals for synchronizing the rotation of sweep of said cathode-ray tube with respect to the rotation of said radiation patterns, and means to apply the signal energy released from said amplifier to said cathode-ray tube.

12. In a beacon system the combination of a transmitter and a receiver according to claim 3, wherein said means for comparing the separated signals comprises a source of high frequency oscillation, means for splitting said high frequency oscillation into two pulsating direct current groups 180° out of phase, each group having an amplitude corresponding to the amplitude of a separate one of the received signals, means to combine the said two groups of oscillations, means to detect any remaining pulsating component of the direct current energy resulting from an unequal combination of the two groups of oscillations, means to generate a blocking voltage in response to any detected pulsating direct current, an amplifier, means to apply at least one of said received signals to said amplifier, and means for controlling the cut-off of said amplifier in response to said blocking voltage.

13. In a beacon system the combination of a transmitter and a receiver according to claim 3, wherein said signals are distinguished from each other by different audio frequency modulations and wherein means for separating said signals in accordance with the identifying characteristic comprises two audio frequency filters, each filter responsive to a separate one of said audio frequency modulations.

14. In a radio direction indicating system in which separate energy is received in accordance with each of a plurality of radiant action patterns having an inter-relationship indicative of a line of direction, said radiant action patterns being scanned through a given cyclic rotation; a source of high frequency oscillation, means for splitting said high frequency oscillation into two pulsating direct current groups 180° out of phase, each group having an amplitude corresponding to the amplitude of a separate one of the received energies, means to combine the said two groups of oscillations, means to detect any remaining pulsating component of the direct current energy resulting from an unequal combination of the two groups of oscillations, means to generate a blocking voltage in response to any detected pulsating direct current, an amplifier, means to apply at least one of said received energies to said amplifier, means for controlling the cutoff of said amplifier in response to the generation of said blocking voltage, an indicator having a given sweep cycle, means to synchronize said sweep cycle with the scanning cycle of said patterns, and means to apply the received energy released from said amplifier to said indicator to produce an indication of direction at a corresponding point in said sweep cycle.

15. In a radio direction indicating system in which a signal is transmitted and reradiation signals in response thereto are received from signal reradiating objects in accordance with each of a plurality of radiant action patterns having an inter-relationship indicative of a line of direction, said radiant action patterns being scanned through a given cyclic rotation, a source of high frequency oscillation, means for splitting said high frequency oscillation into two pulsating direct current groups 180° out of phase, each group having an amplitude corresponding to the amplitude of a separate one of the received signal energies, means to combine the said two groups of oscillations, means to detect any remaining pulsating component of the direct current energy resulting from an unequal combination of the two groups of oscillations, means to generate a blocking voltage in response to any detected pulsating direct current, an amplifier, means to apply at least one of the received signals to the amplifier, means for controlling the cutoff of said amplifier in response to said blocking voltage, a cathode ray tube indicator having a given sweep cycle, means to synchronize said sweep cycle with the scanning cycle of said patterns, and means to apply the received reradiation signals to said cathode ray tube indicator to produce an indication at a corresponding point in said sweep cycle.

16. A comparator for comparing separate pulse energies of two sources and releasing the pulse energy thereof in response to a predetermined ratio of value of said separate energies, said comparator including a source of high frequency oscillation, means for splitting said high frequency oscillation into two pulsating direct current groups 180° out of phase, said groups having amplitudes corresponding to the values of the responsive energies, means for combining said groups of oscillations, means to detect any remaining pulsating component of the direct current energy resulting from an unequal combination of the two groups of oscillations, an amplifier, means to apply the pulse energy of at least one of said sources to said amplifier, and means for controlling the cut off of said amplifier in accordance with the pulsating component of the direct current remaining as a result of combining the separate groups of oscillations.

HENRI G. BUSIGNIES.

REFERENCES CITED

The following references are of record in the file of this patent:

UNITED STATES PATENTS

| Number | Name | Date |
| --- | --- | --- |
| 1,723,907 | Alexanderson | Aug. 6, 1929 |
| 1,821,650 | Kolster | Sept. 1, 1931 |
| 1,903,846 | Willoughby | Apr. 18, 1933 |
| 2,234,654 | Runge | Mar. 11, 1941 |
| 2,456,666 | Agate et al. | Dec. 21, 1948 |